Patented Mar. 24, 1925.

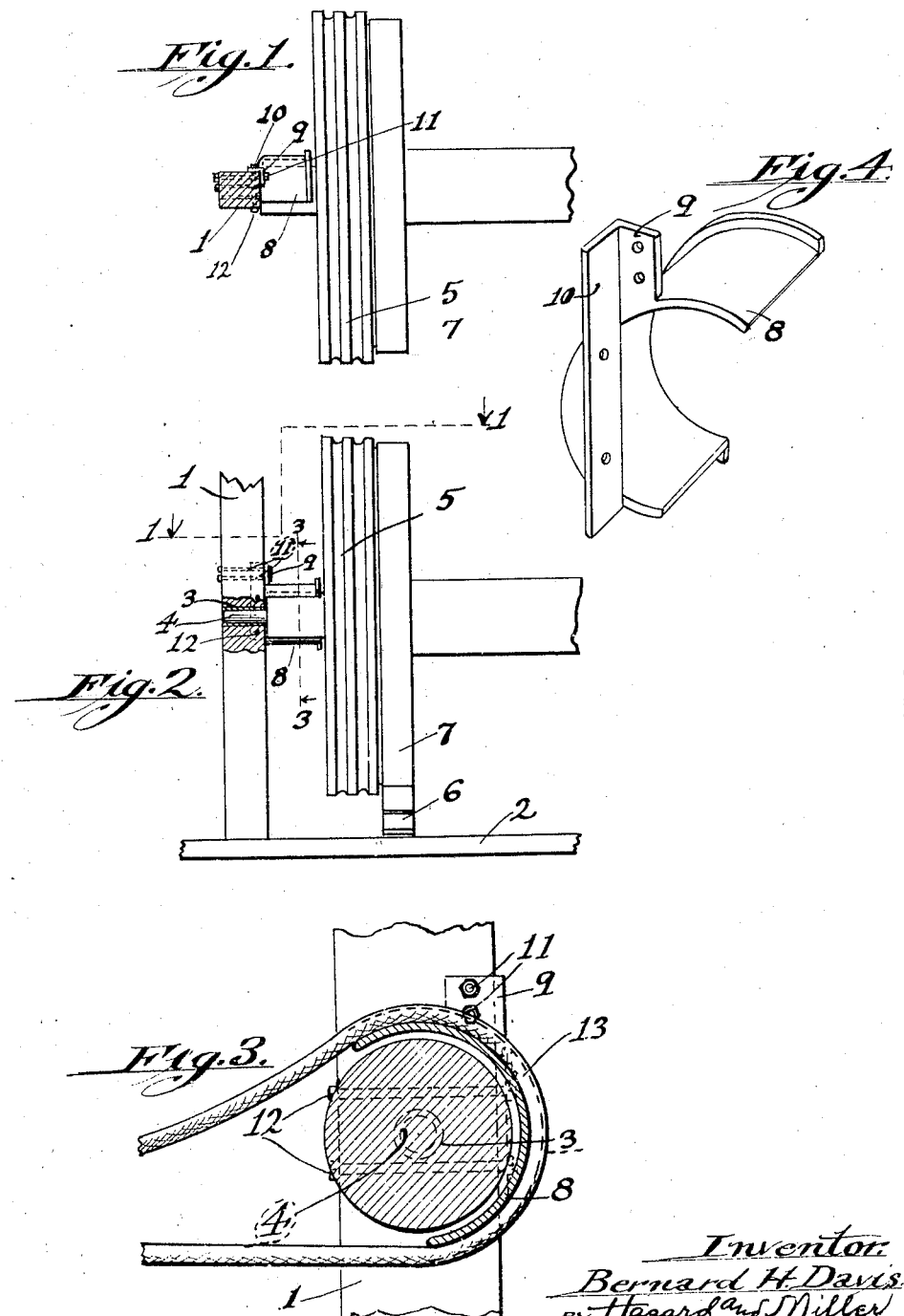

1,531,233

UNITED STATES PATENT OFFICE.

BERNARD H. DAVIS, OF FULLERTON, CALIFORNIA.

SADDLE FOR BULL-WHEEL ROPES.

Application filed January 24, 1924. Serial No. 688,126.

*To all whom it may concern:*

Be it known that I, BERNARD H. DAVIS, a citizen of the United States, residing at Fullerton, in the county of Orange and State of California, have invented new and useful Improvements in Saddles for Bull-Wheel Ropes, of which the following is a specification.

This invention relates to oil well rigs and especially to bull wheels and bull wheel ropes, and consists of the novel features herein shown, described and claimed.

Heretofore it has been the practice in lowering the working cable into a well, as with a bailer, to throw the driving ropes off the bull wheel driver and allow the ropes to hang on the bull wheel shaft, and this operation wears the ropes in spots.

My object is to make a saddle to fit the bull wheel shaft loosely and carry the ropes out of contact with the rotating shaft.

Figure 1 is a fragmentary elevation of a bull wheel shaft, the bull wheel driver and the post supporting one end of the shaft, parts being broken away and shown in section.

Fig. 2 is a horizontal section on the line 2—2 of Fig. 1.

Fig. 3 is a vertical cross section on the line 3—3 of Fig. 1 and looking in the direction indicated by the arrows.

Fig. 4 is a perspective of the saddle shown supporting the rope in Fig. 3.

The back jack post 1 is rigidly mounted upon the derrick deck or floor 2 and has a bearing 3 supporting one end of the bull wheel driver shaft 4. The bull wheel driver 5 is fixed upon one end of the shaft 4 near the post 1. The brake mechanism 6 is mounted upon the floor 2 to engage the brake wheel portion 7 of the driver 5.

A saddle constructed and applied in accordance with the principles of my invention, comprises a semi-cylindrical saddle plate 8 adapted to fit loosely around the bull wheel driver shaft 4 between the driver 5 and the post 1. An attaching flange 9 extends outwardly at the inner end of the saddle plate 8 and a second attaching flange 10 extends at right angles to the flange 9, so that the flanges 9 and 10 will fit the corner of the post 1 and may be secured to the post by bolts 11 and 12.

The saddle is preferably a casting.

When the driving rope 13 is removed from the driver 5 it will hang loosely upon the saddle 8 between the driver 5 and the post 1, and the spinning of the bull wheel driver shaft will not wear the rope.

Thus I have produced a saddle for loosely supporting the driving rope of a bull wheel while the rope is removed from the bull wheel driver to allow the bull wheel driver to spin, said saddle consisting of a semi-cylindrical plate adapted to fit loosely around the bull wheel shaft, and means for connecting the plate to a post.

Various changes may be made without departing from the spirit of my invention as claimed.

I claim:

1. The combination with a back jack post having a bearing, a bull wheel driver shaft mounted in the bearing and a bull wheel driver mounted upon the shaft, of a stationary saddle comprising a semi-cylindrical plate adapted to fit loosely around the bull wheel driver shaft between the driver and the post, a flange on the saddle adjacent the bull wheel driver, an attaching flange extending outwardly at the inner end of the plate and fitting against the inner side of the post, a second attaching flange at right angles to the first flange and fitting against the post, and means securing the flanges to the post.

2. The combination with a back jack post having a bearing, a bull wheel driver shaft mounted in the bearing and a bull wheel driver mounted upon the shaft, of a stationary saddle comprising a semi-cylindrical plate adapted to fit loosely around the bull wheel driver shaft between the driver and the post, a flange on the saddle adjacent the bull wheel driver, an attaching flange extending outwardly at the inner end of the plate and fitting against the inner side of the post, said post support for the saddle being spaced from the bull wheel driver a sufficient distance to allow the support of the loose rope on the saddle clear of the said wheel.

In testimony whereof I have signed my name to this specification.

BERNARD H. DAVIS.